(12) United States Patent
Coles et al.

(10) Patent No.: US 9,217,305 B2
(45) Date of Patent: Dec. 22, 2015

(54) DOWNHOLE TOOL STRING BRAKING

(71) Applicant: Halliburton Energy Services, Inc., Houston, TX (US)

(72) Inventors: Randolph S. Coles, Spring, TX (US); Ed F Kopecky, East Bernard, TX (US); Christian S. Mappus, Kingwood, TX (US); Jonathan P. Montiverdi, Missouri City, TX (US); Neil A. Ostermann, Humble, TX (US); Budi P. Sidik, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/395,942

(22) PCT Filed: Dec. 27, 2013

(86) PCT No.: PCT/US2013/078011
§ 371 (c)(1),
(2) Date: Oct. 21, 2014

(87) PCT Pub. No.: WO2015/099770
PCT Pub. Date: Jul. 2, 2015

(65) Prior Publication Data
US 2015/0285017 A1 Oct. 8, 2015

(51) Int. Cl.
*E21B 23/01* (2006.01)
*E21B 43/116* (2006.01)

(52) U.S. Cl.
CPC .............. *E21B 23/01* (2013.01); *E21B 43/116* (2013.01)

(58) Field of Classification Search
CPC .................................. E21B 23/00; E21B 23/01
See application file for complete search history.

(56) References Cited

U.S. PATENT DOCUMENTS

| 3,064,737 | A |   | 11/1960 | Quinn |
| 3,820,389 | A | * | 6/1974  | Richter, Jr. et al. ........ 73/152.59 |
| 4,375,834 | A |   | 3/1983  | Trott |
| 4,415,029 | A |   | 11/1983 | Pratt et al. |
| 4,735,268 | A |   | 4/1988  | Harris et al. |

(Continued)

FOREIGN PATENT DOCUMENTS

EP          1344893          9/2003

OTHER PUBLICATIONS

International Search Report and Written Opinion of the International Searching Authority issued in International Application No. PCT/US2013/078011 on Sep. 24, 2014; 12 pages.

*Primary Examiner* — William P Neuder
(74) *Attorney, Agent, or Firm* — Scott H. Brown; Fish & Richardson P.C.

(57) ABSTRACT

A braking apparatus for a tool string positionable in a wellbore and a method of braking a tool string in a wellbore is disclosed. The braking apparatus includes: a tubular housing having at least one radial arm-bay opening; an actuating mechanism including: a wedge member mounted in an internal cavity of the housing; an axial guide rod coupled at one end to the wedge member; and a push-pull device. The push pull device includes: a biasing member casing through which the guide rod extends to contact the wedge member, a biasing member; and at least one braking arm pivotably mounted to a lower portion of the biasing member casing, wherein when the biasing member casing of the push-pull device in in a lowered position, the braking arm bears on a sloped surface of the wedge member to project the braking arm into contact with a wellbore wall.

18 Claims, 4 Drawing Sheets

(56) References Cited

U.S. PATENT DOCUMENTS

| | | |
|---|---|---|
| 4,971,146 A | 11/1990 | Terrell |
| 5,348,091 A | 9/1994 | Tchakarov et al. |
| 5,700,968 A | 12/1997 | Blimke |
| 6,223,818 B1 | 5/2001 | Hrupp |
| 7,757,767 B2 | 7/2010 | Hill et al. |
| 2001/0004016 A1 | 6/2001 | Hillyer |
| 2003/0024702 A1 | 2/2003 | Gray et al. |
| 2004/0011533 A1 | 1/2004 | Lawrence et al. |
| 2009/0071659 A1 | 3/2009 | Spencer et al. |

\* cited by examiner

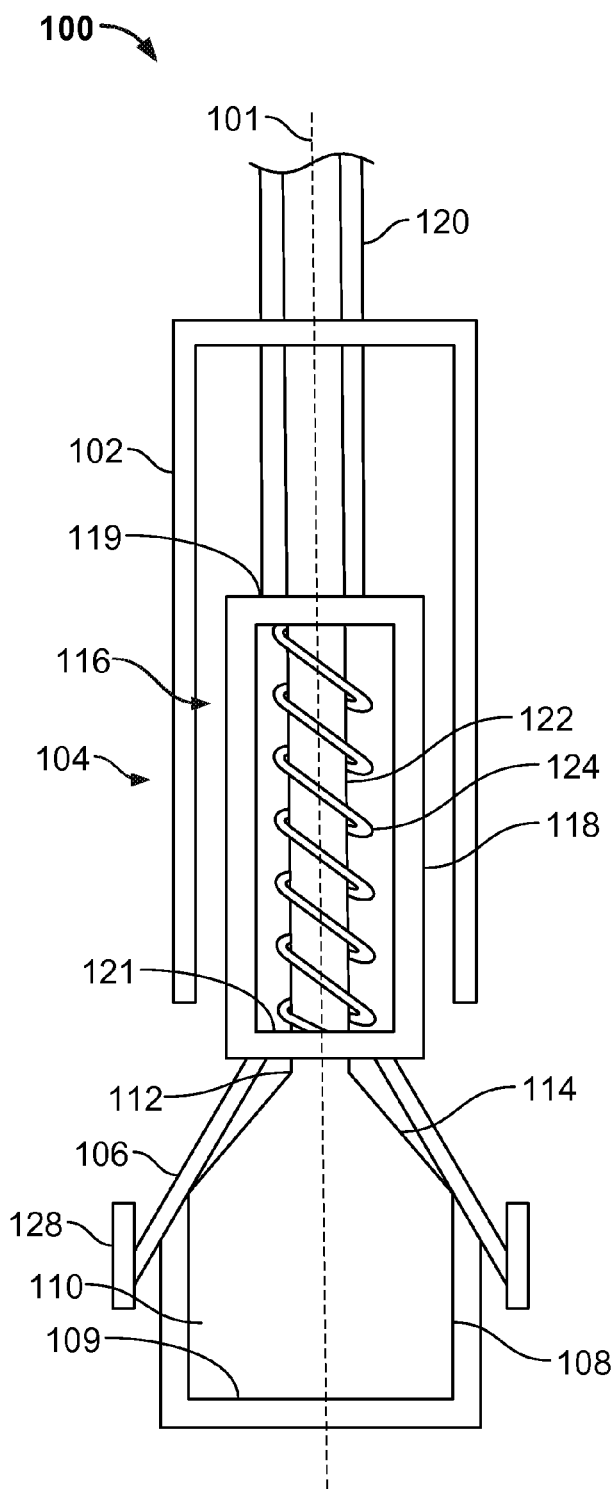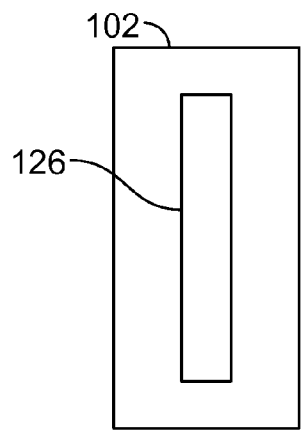
FIG. 3A
FIG. 3B

DOWNHOLE TOOL STRING BRAKING

CLAIM OF PRIORITY

This application is a U.S. National Stage of International Application No. PCT/US2013/078011, filed Dec. 27, 2013.

TECHNICAL FIELD

The present disclosure relates to systems, apparatus, and methods relating to tool string braking in a downhole drilling environment.

BACKGROUND

Where downhole tools are used to accomplish stationary tasks (e.g., well-logging or well-completion tasks) via suspension lines (e.g., wirelines or slicklines) in a wellbore, the depth of the suspended tool string is of considerable importance. For example, in well-logging processes, it is often necessary to take corresponding measurements over multiple runs at the same depth position within the wellbore. Additionally, logs from different wellbores may be depth-matched for comparison. Thus, errors in depth measurement of the tool string are detrimental to data interpretation. Moreover, performing completion processes at the wrong depth can result in excessive fluid production in the wellbore and/or entirely bypassing a particular zone of interest in the wellbore.

To locate the tool string in a substantially vertical wellbore, one conventional process is to initially drop the tool string below the intended depth and subsequently pull the tool string up to the target depth by a winch, so that the cable is held in tension. Yet, when the winch is stopped at the target depth, the tool string continues to move on the suspension line upward out of the wellbore. This phenomenon is known as "creep." Failure to account for creep causes downhole tool operations to be conducted at an incorrect depth.

DESCRIPTION OF DRAWINGS

FIG. 3A is a cross-sectional side view of the braking apparatus of FIG. 2 with the spring casing in a lowered position.

FIG. 3B is an enlarged view of a side slot of the braking apparatus of FIG. 2.

DETAILED DESCRIPTION

Figure 1:
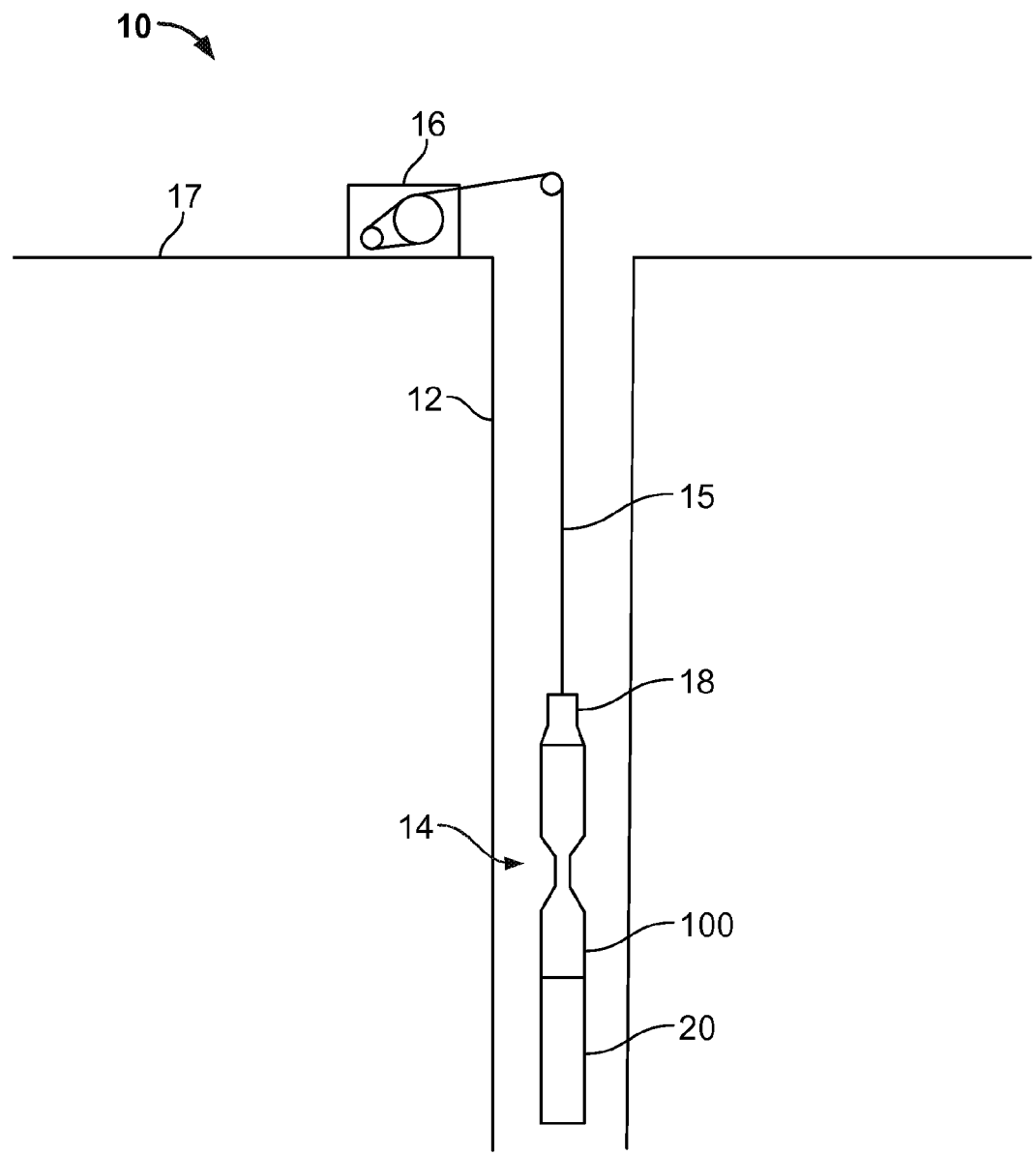
FIG. 1 is a schematic diagram of a tool conveyance system for use in a downhole environment of a wellbore.

FIG. 1 is schematic diagram of an exemplary tool conveyance system 10 for use in a downhole environment of a wellbore 12. The tool conveyance system 10 includes a tool string 14, a suspension line 15, and a hoisting mechanism 16. As shown, the tool string 14 is supported in the wellbore 12 by the suspension line 15. In some examples, the suspension line 15 is an electrically conductive wireline that physically supports the tool string 14 and conveys electricity to the tool string. In other examples, however, the suspension line 15 is non-electrically conductive slickline that only provides physical support to the tool string 14. The hoisting mechanism 16 provides motive force for moving the suspension line 15, and thus the tool string 14, through the wellbore 12. In this example, the hoisting mechanism 16 is anchored to a ground surface 17 at the head of the wellbore 12. However, other implementations may employ the hoisting mechanism 16 on a drilling rig, offshore platform, heavy-duty vehicle, etc. The hoisting mechanism 16 may include a motorized winch, crank, pulley or any other device suitable for anchoring and/or providing motive force to the suspension line 15.

The tool string 14 includes a cable head 18, a downhole tool 20, and a braking apparatus 100. The cable head 18 securely couples the tool string 14 to the suspension line 15. If the suspension line 15 is an electrical wireline, the cable head provides an electrical connection between the wireline and the downhole tool 20. The downhole tool 20 may include one or more various types of downhole tools. The downhole tool(s) can be designed to accomplish well-logging tasks, such as measuring rock and fluid properties in a new wellbore and/or measuring pressures or flow rates in the wellbore. The downhole tool(s) can also be designed to accomplish well-completion tasks, such as perforating the wellbore casing to allow the inflow of gas and liquids. Downhole tools suitable for various other well-logging and/or well-completion operations can also be used. In some examples, the downhole tool 20 can include at least one well-logging tool and at least one well-completion tool.

In the foregoing description of the tool conveyance system 10, various items of conventional equipment may have been omitted to simplify the description. However, those skilled in the art will realize that such conventional equipment can be employed as desired. Those skilled in the art will further appreciate that various components described are recited as illustrative for contextual purposes and do not limit the scope of this disclosure. Further, while the tool conveyance system 10 is shown in an arrangement that facilitates deployment in a substantially vertical or straight wellbore, it will be appreciated that arrangements are also contemplated in a horizontal or highly deviated wellbore environment where the tool string may experience involuntary movement and therefore are within the scope of the present disclosure. The tool conveyance system 10 and other arrangements may also be used in wellbores drilled at an angle greater than 90 degrees to inhibit tool string movement due to gravitational forces.

Figure 2:
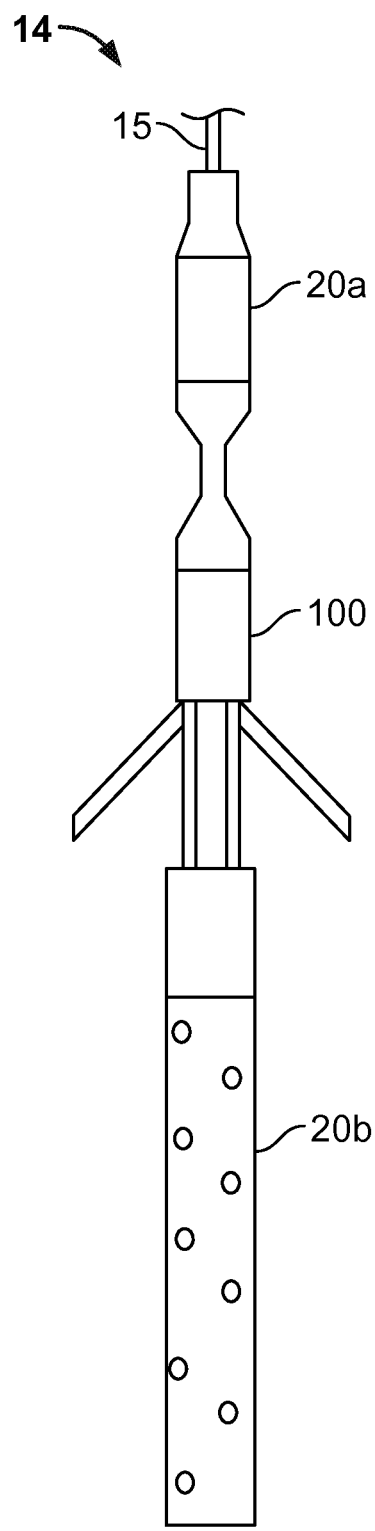
FIG. 2 is a side view of a tool string for a downhole tool conveyance system.

FIG. 2 is a side view of a tool string 14 that can, for example, be incorporated in the tool conveyance system 10 depicted in FIG. 1. In this example, the downhole tool 20 includes a casing collar locator 20a and a perforating gun 20b. The casing collar locator 20a is an electrical well-logging tool used for depth correlation. The perforating gun 20b is a well-completion tool designed to create perforations (e.g., punched holes) in the casing of the wellbore, allowing oil and/or gas to flow through the casing into the wellbore.

While the casing collar locator 20a and the perforating gun 20b are common downhole tools, their illustration in this example is not intended to be limiting. As discussed above, any suitable downhole tools are embraced by the present disclosure. Further, while in this example, the braking apparatus 100 is located between the casing collar locator 20a and the perforating gun 20b, other arrangements are also contemplated. For example, the braking apparatus 100 can be located at the leading or trailing end of the tool string 14 without departing from the scope of this disclosure.

Figure 3C:
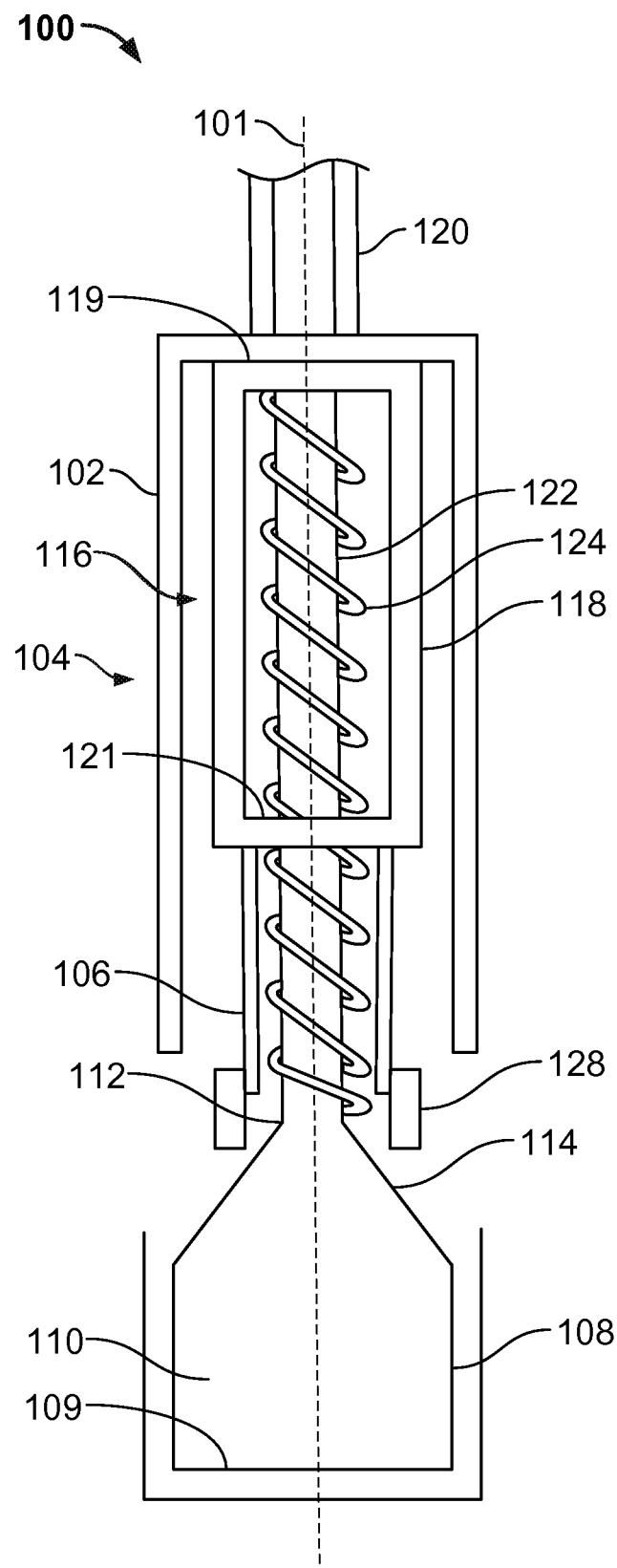
FIG. 3C is a cross-sectional side view of the braking apparatus of FIG. 2 with the spring casing in a raised position.

Referring next to FIGS. 3A-3C, the braking apparatus 100 includes a housing 102, an actuating mechanism 104, and a pair of braking arms 106. As shown, components of the braking apparatus 100 are arranged about a central longitudinal axis 101. The housing 102 is a hollow tubular body having an external cylindrical side wall outlining an internal cavity. The actuating mechanism 104 includes a wedge member 108 located at the floor 109 of the housing 102. As shown, the wedge member 108 includes a cylindrical pedestal 110 projecting to a frustoconical tip 112 defined by a sloping outer conical surface 114.

The actuating mechanism 104 further includes a push-pull device 116 coupled to the housing 102. The push-pull device 116 includes a biasing member casing 118 to house a biasing member (further discussed below) and a linkage member 120 attached to the upper end 119 of the biasing member casing. The linkage member 120 is connectable directly to the suspension line 15 or indirectly via other tool string elements to the suspension line. Similar to the housing 102, the biasing member casing 118 is a hollow tubular body having a cylindrical side wall outlining an internal cavity. A guide rod 122 extends through the internal cavity of the biasing member casing 118 and through the floor 121 of the biasing member casing to reach the frustoconical tip 112 of the wedge member 108. The distal end of the guide rod is attached to the tip 112 of the wedge member 108. A biasing member 124 is disposed coaxially about the guide rod 122. The biasing member 124 urges the biasing member casing 118 downward towards the wedge member 108. The biasing member 124 is biasing to provide a downward biasing force at least as great as the weight of the tool string. In this example, the biasing member is an axial coil spring, in which the context of the casing 118 may alternatively be referred to as a spring casing 118; However, other types of biasing members (and corresponding casing for the biasing member) may also be employed as an alternative or supplementing biasing member (e.g., a disk spring, a resilient sleeve, and/or a compressible gas or fluid).

The linkage member 120 is coupled, directly or indirectly, to the suspension line 15. In either case, the coupling between the linkage member 120 and the suspension line 15 is such that at least a portion of the pulling force imparted on the suspension line by the hoisting mechanism 16 is conveyed to the linkage member 120. So, when the hoisting mechanism 16 exerts a pulling force on the suspension line 15, the spring casing 118 is pulled (e.g., with substantially equal pulling force) via its attachment to the linkage member 120. When the pulling force on the linkage member 120 exceeds the biasing force of the biasing member 124, the biasing member collapses, allowing the spring casing 118 to be moved upward in the housing 102, away from the wedge member 108. When the pulling force is reduced, or ceases, the biasing member 124 urges the spring casing back downward towards the wedge member 108.

The braking arms 106 are pivotally coupled to the floor 121 of the spring casing 118 and extend downward towards the wedge member 108. As shown in FIG. 3A, when the spring casing 118 is in the lowered position (e.g., when the pulling force exerted on the linkage member 120 is less than the biasing force of the biasing member 124), the braking arms 106 bear against the sloping conical surface 114 of the wedge member 108, forcing the braking arms 106 to pivot radially outward. In this position, the braking arms 106 protrude through arm-bay openings 126 formed radially along a lower portion of the housing 102 (see FIG. 3B). With the braking arms 106 deployed through the arm-bay openings 126, brake pads 128 formed on the distal ends of the braking arms 106 are designed to engage a casing wall of the wellbore 12. Friction between the casing of the wellbore 12 and the brake pads 128 produce a braking force to hold the tool string 14 in place. Thus, the hoisting mechanism 16 is stopped when it is determined that the tool string 14 is at the target depth within the wellbore 12, thereby eliminating the pulling force, the braking force from the deployed braking arms 106 counteracts the creep phenomenon.

FIG. 3C shows the spring casing 118 in a raised position (e.g., when the pulling force on the linkage member 120 is greater than the biasing force of the biasing member 124). In the raised position, the braking arms 106 pivot radially inward toward the central longitudinal axis 101 of the braking apparatus 100. The inward pivoting motion of the braking arms 106 pulls the brake pads 128 away from the wellbore casing, lessening the friction braking force and allowing the pulling force of the hoisting mechanism 16 to move the tool string 14 upward through the wellbore 12.

In some embodiments, to reduce frictional drag as the tool string 14 is being lowered through the wellbore 12, an electrical or mechanical device can be employed to hold the braking arms 106 in a retracted state until the lowest tool depth is reached. For example, a band can be used to hold the arms closed until a small charge is set off that would break a link in the band. The braking arms would then expand to the point allowed by the mechanism. As yet another example, a small motor could be used to hold the braking arms in place while the tool string is being lowered through the wellbore.

A number of embodiments of the invention have been described. Nevertheless, it will be understood that various additions and modifications may be made without departing from the spirit and scope of the inventions.

What is claimed is:

1. A braking apparatus for a tool string positionable in a wellbore, the braking apparatus comprising:
   a tubular housing having a cylindrical side wall defining at least one radial arm-bay opening;
   an actuating mechanism including:
      a wedge member mounted in an internal cavity of the housing;
      an axial guide rod coupled at one end to the wedge member; and
      a push-pull device including:
         a biasing member casing having an upper axial opening and a lower axial opening through which the guide rod extends to contact the wedge member, the biasing member casing slidably positioned on the guide rod;
         a biasing member located within an internal cavity of the of the biasing member casing, the biasing member biasing the biasing member casing toward a lowered position in the tubular housing; and
      a linkage member attached to the biasing member casing and connectable directly to a suspension line or indirectly via other tool string elements to the suspension line; and
      at least one braking arm pivotably mounted to a lower portion of the biasing member casing, and wherein when the biasing member casing of the push-pull device is in the lowered position, the braking arm bears on a sloped surface of the wedge member to project the braking arm through the radial arm-bay opening of the tubular housing.

2. The braking apparatus of claim 1 further including a braking pad coupled to a distal end of the braking arm.

3. The braking apparatus of claim 1 wherein the wedge member comprises a truncated conical member, the truncated conical member having an apex tip attached to the guide rod.

4. The braking apparatus of claim 1, wherein the tool string includes a perforating gun connected to a lower end of the braking apparatus.

5. The braking apparatus of claim 1, wherein a casing collar locator is connected to an upper end of the braking apparatus and a suspension line is coupled to the casing collar locator.

6. The braking apparatus of claim 5 further including additional arm-bay openings and additional braking arms, the additional arm-bay openings located radially about the tubular housing, and the additional braking arms located radially about the biasing member casing of the actuating mechanism.

7. The braking apparatus of claim 1 further including additional arm-bay openings and additional braking arms, the additional arm-bay openings located radially about the tubular housing, and the additional braking arms located radially about the biasing member casing of the actuating mechanism.

8. The braking apparatus of claim 1 wherein the biasing member is arranged to provide a biasing force at least as great as the weight of the tool string.

9. The braking apparatus of claim 1 wherein the biasing member comprises an axial coil spring disposed coaxially about the guide rod.

10. A method of braking for a tool string positionable in a wellbore, the method comprising:
   inserting a braking apparatus in a tool string, the braking apparatus comprising:
      a tubular housing having a cylindrical side wall defining at least one radial arm-bay opening;
      an actuating mechanism including:
         a wedge member mounted in an internal cavity of the housing;
         an axial guide rod coupled at one end to the wedge member; and
         a push-pull device including:
            a biasing member casing having an upper axial opening and a lower axial opening through which the axial guide rod extends to contact the wedge member, the biasing member casing slidably positioned on the guide rod;
            a biasing member located within an internal cavity of the of the biasing member casing, the biasing member exerting a biasing force on the biasing member casing, urging the biasing member casing toward a lowered position in the tubular housing; and
         at least one braking arm pivotably mounted to a lower portion of the biasing member casing;
   positioning the tool string with the braking apparatus in a wellbore connected to a support line; and
   maintaining a predetermined tension in the support line sufficient to provide an upward force on a linkage member attached to a biasing member casing of the push-pull device sufficient to compress the biasing member and pivot the braking arm inwardly over a sloped surface of the wedge member, retracting the braking arm through the radial arm-bay opening of the tubular housing.

11. The method of claim 10 further comprising:
   positioning the tool string at a predetermined location in the wellbore;
   reducing the tension in the support line, thereby allowing the biasing force to move the biasing member casing of the push-pull device downward to the lowered position;
   thereby pivoting the braking arm outward over sloped surface of the wedge member, deploying the braking arm through the arm-bay opening of the tubular housing; and
   contacting a wall of the wellbore with the braking arm to create a friction braking force.

12. The method of claim 11 wherein the linkage member is connected directly to a suspension line or indirectly to the suspension line via other tool string elements.

13. The method of claim 11 further including holding the braking arms in a retracted state while the tool string is being lowered through the wellbore; and
   when a predetermined location is reached in the wellbore, releasing the hold to allow the braking arm to project from the housing and contact a wall of the wellbore.

14. The method of claim 11, wherein contacting a wall of the wellbore with the braking arm to create a friction braking force comprises:
   contacting the wall with a braking pad mounted on a distal end of the braking arm.

15. The method of claim 10 wherein the linkage member is connected directly to a suspension line or indirectly to the suspension line via other tool string elements.

16. The method of claim 10 further including holding the braking arms in a retracted state while the tool string is being lowered through the wellbore; and
   when a predetermined location is reached in the wellbore, releasing the hold to allow the braking arm to project from the housing and contact a wall of the wellbore.

17. The method of claim 10 wherein the biasing member is arranged to provide a biasing force at least as great as the weight of the tool string.

18. The method of claim 10 wherein the biasing member comprises an axial coil spring disposed coaxially about the guide rod.

* * * * *